UNITED STATES PATENT OFFICE.

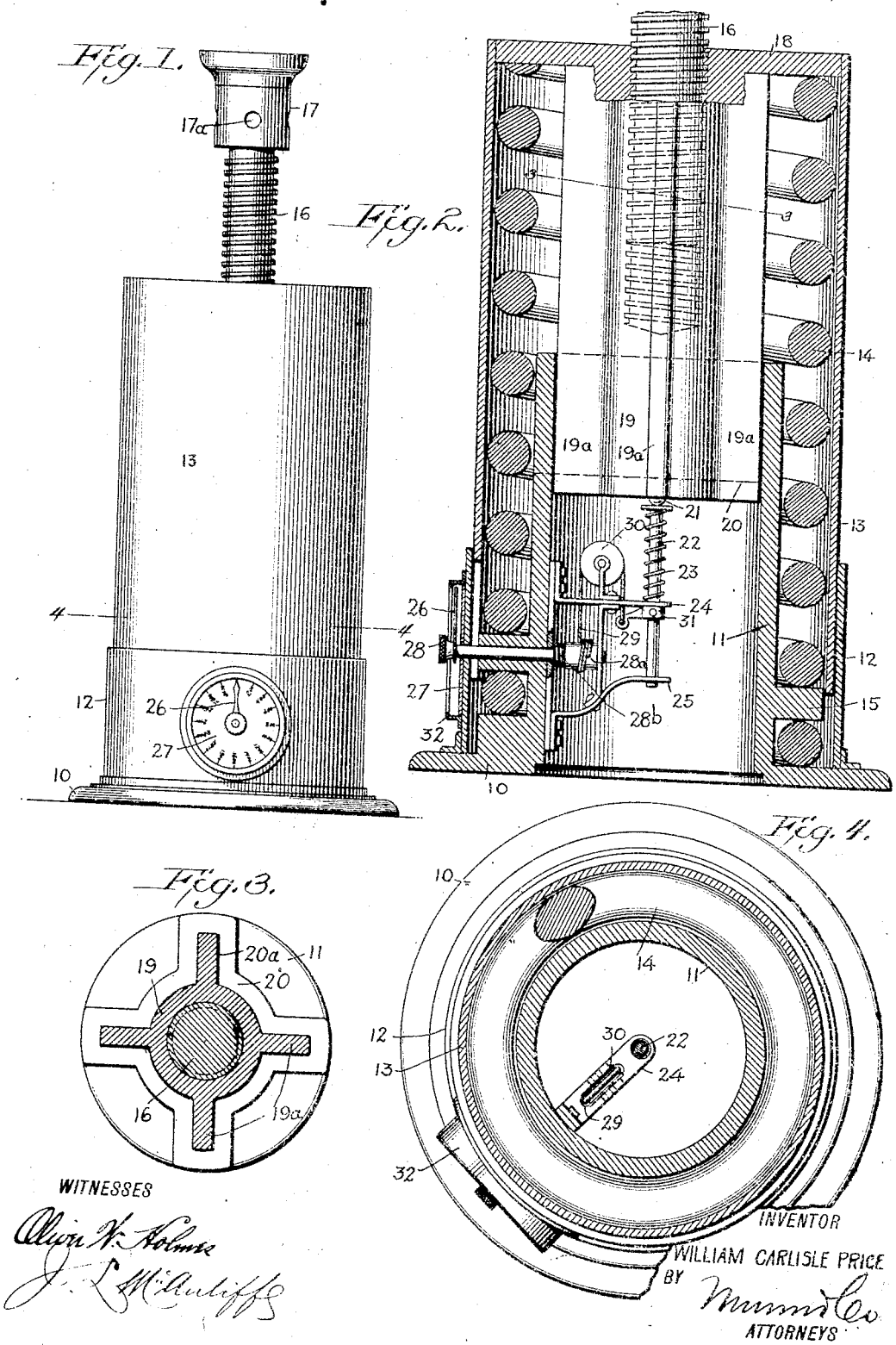

WILLIAM CARLISLE PRICE, OF MIDDLETON, IDAHO.

WAGON-SCALE.

1,112,320.      Specification of Letters Patent.      Patented Sept. 29, 1914.

Application filed August 1, 1913. Serial No. 782,446.

*To all whom it may concern:*

Be it known that I, WILLIAM CARLISLE PRICE, a citizen of the United States, and a resident of Middleton, in the county of Canyon and State of Idaho, have invented a new and Improved Wagon-Scale, of which the following is a full, clear, and exact description.

It is the object of my invention to provide a scales especially adapted for use in farming districts for the weighing of wagon loads, such as loose hay or like material, requiring the use of platform scales, such scales being often many miles distant from farms in the farming districts of the West.

In carrying out my invention I employ a load-lifting means which may take the form of a jack and which may be variously arranged with respect to the scale elements coacting therewith so that the scale elements offer yielding resistance to the lifting means and indicate the weight of the lifted load.

The distinguishing features of my invention and the improved structural elements characterizing the practical embodiments which are illustrated as examples, will be more particularly explained in the specific description following.

Reference is to be had to the accompanying drawings forming a part of this specification, in which similar characters of reference indicate corresponding parts in all the views, and in which—

Figure 1 is a side elevation of a weighing scales embodying my invention; Fig. 2 is a vertical sectional view on a larger scale; Fig. 3 is a detail plan view of features to be hereinafter referred to; and Fig. 4 is a horizontal section.

In constructing the illustrated practical embodiment of the invention, the base 10 is formed with an inner cylinder 11 which rises therefrom and with an outer cylinder 12, and a telescoping cylinder section 13 is arranged in connection with the cylinder 12. The upper cylinder section 13 is sustained by a spiral spring 14 which in the example shown is disposed at its lower end between the said upper cylinder 13 and the inner cylinder 11. The spring is held at its lower end by a spiral flange 15 on the cylinder 11 beneath which the lower convolution of the spring is passed. A jack is provided, which in this instance is in the form of a jack screw 16 having a head 17 to be placed against a wagon axle, said head having the usual holes 17ª to receive a turning lever. The screw 16 operates in the head 18 of the cylinder 13.

In practice the cylinders 12 and 13 may have such strength and proportions that the outer cylinder 13 will have sufficient strength and be properly guided to sustain the load to which the jack is subjected. In the illustrated example I provide a guiding means additional to the cylinder 13, consisting of a depending member 19 having radial wings 19ª which have guided movement in radial slots 20ª of the head 20 formed on the inner cylinder 11. The arrangement is such that the device may be placed beneath a wagon with the head 17 of the jack directly beneath one of the axles, and the turning of the screw will therefore result in forcing the cylinder 13 and its head 18 downwardly against the resistance of the spring 14, thereby carrying downward the depending member 19 until the resistance of the spring is sufficient to sustain the load, after which the turning of the screw will lift the load, thereby placing the latter on the spring.

The indicating means of the scale elements are required to be only such as to indicate the extent of movement of the cylinder 13 and its appurtenances. In the present example there is a movable element actuated by the downward movement of the depending member 19 on the head 18, and an indicator to indicate the extent of movement of the said element. Thus, a spindle 22 is disposed co-axially with the member 19 and on the lower end of said member a projection 21 is produced bearing against the upper end of said spindle 22. The spindle has guided movement in approved means, such as brackets 24—25 suitably secured to the cylinder 11 at the interior thereof, and surrounding said spindle is a compression spring 23. A pointer arm 26 responds to the movements of the spindle 22 and moves over the dial 27. Movement in the present instance is imparted to the pointer by a spindle 28 mounting said pointer, the spindle having a drum 28ª on which a cord 29 winds, said cord passing over an idler 30 and being secured to an arm 31 on the spindle 22. Thus, as the spindle 22 is moved downward by the member 19 in response to the turning of the screw when placed against the axle, the arm 31 thereof is carried downwardly and exerts a pull on the cord 29, thereby turning the spindle 28 and the pointer 26 thereof. At the same time the spring 28$^b$ on the spindle 28 is wound so that upon the member 19 rising, and the consequent raising of the spindle 22 by its spring 23, the coiled spring 28$^b$ will return the pointer to the neutral position and at the same time wind in the slack of the cord 29.

In the use of the improved scales one of the devices will be placed beneath the rear axle of the wagon and the indicated weight having been noted, the device is applied beneath the front axle; the sum of the indicated weights will represent the total weight of the load. A housing or flange 32 may be provided around the dial and pointer, 27 and 26 respectively.

Having thus described my invention, what I claim as new and desire to secure by Letters Patent is:—

1. In a weighing scales of the character indicated, a base having a cylinder rising therefrom, a yieldingly supported outer cylinder spaced from the first cylinder and provided with a head, a vertical jack screw operating in the said head, a depending member on the head, a guide head in the first cylinder, in which guide head the depending member has movement, a spring-pressed spindle supported in the inner cylinder, a movable indicator device, and operative connections between the indicator device and the spindle.

2. In a weighing scales of the character described, a base, an inner cylinder on said base formed with a spiral flange at the interior, an outer cylinder, a spiral spring disposed between the cylinders, convolutions of the spring engaging said flange, a head on the outer cylinder resting on the spring, a vertical jack screw extending through said head and having threaded engagement therewith, and indicating means arranged to indicate the movements of the head by the jack screw.

3. In a weighing scales of the character described, a base having a cylinder thereon and an outer cylinder having a head, a compression spring supporting said head and cylinder, said head having a depending member, a spindle in the inner cylinder beneath the said depending member, a spring normally tending to raise the spindle, a dial on the outer cylinder, a pointer movable over said dial and having a spindle extending to the interior of the scales, and actuating means connecting the two spindles.

In testimony whereof I have signed my name to this specification in the presence of two subscribing witnesses.

WILLIAM CARLISLE PRICE.

Witnesses:
L. N. B. CARPENTER,
S. S. FOOTE.